Oct. 29, 1929.       C. STEENSTRUP       1,733,835
WIRE FEEDING MECHANISM FOR WELDING MACHINES
Filed Nov. 23, 1927       2 Sheets-Sheet 1
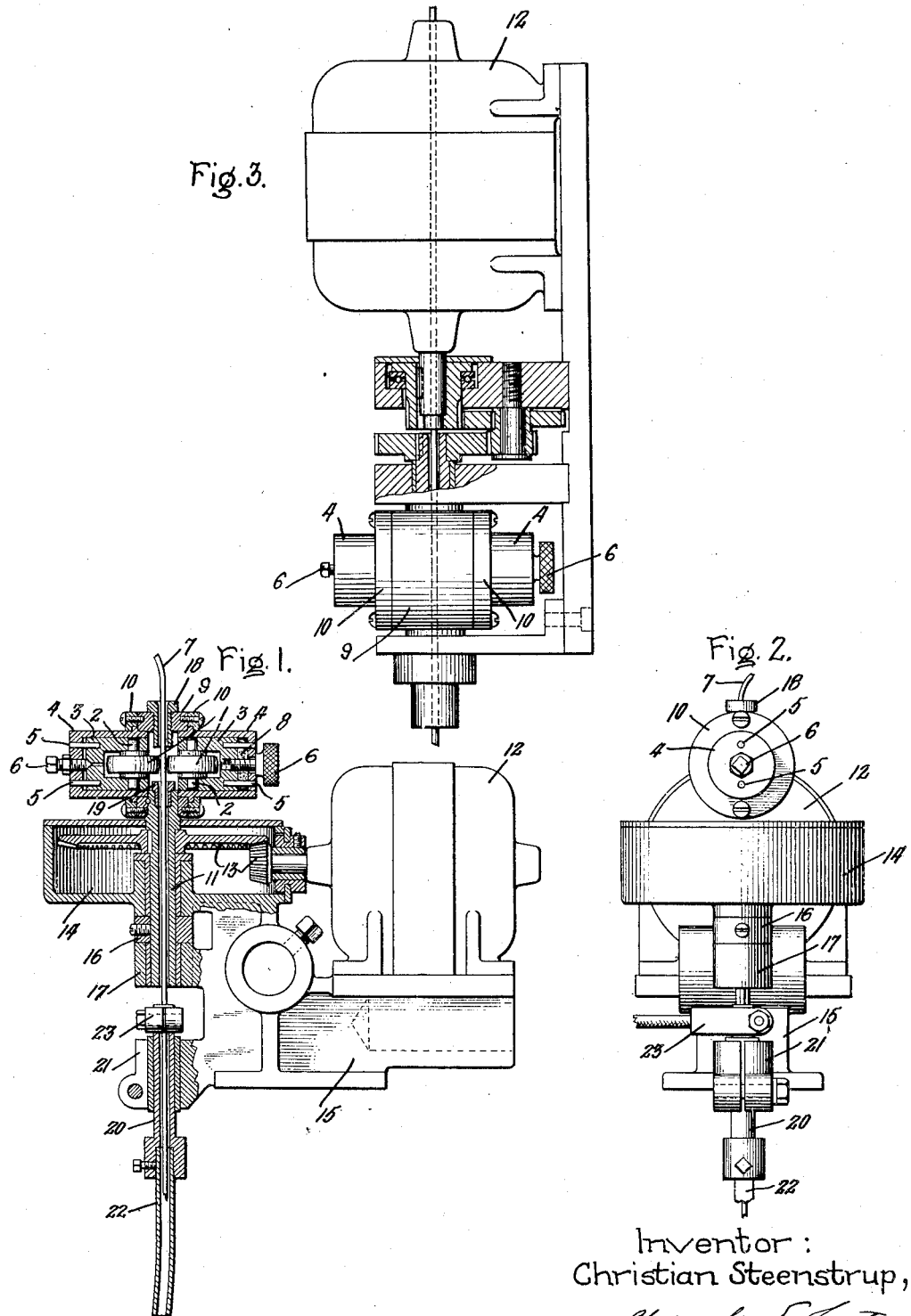
Inventor:
Christian Steenstrup,
by *[signature]*
His Attorney.

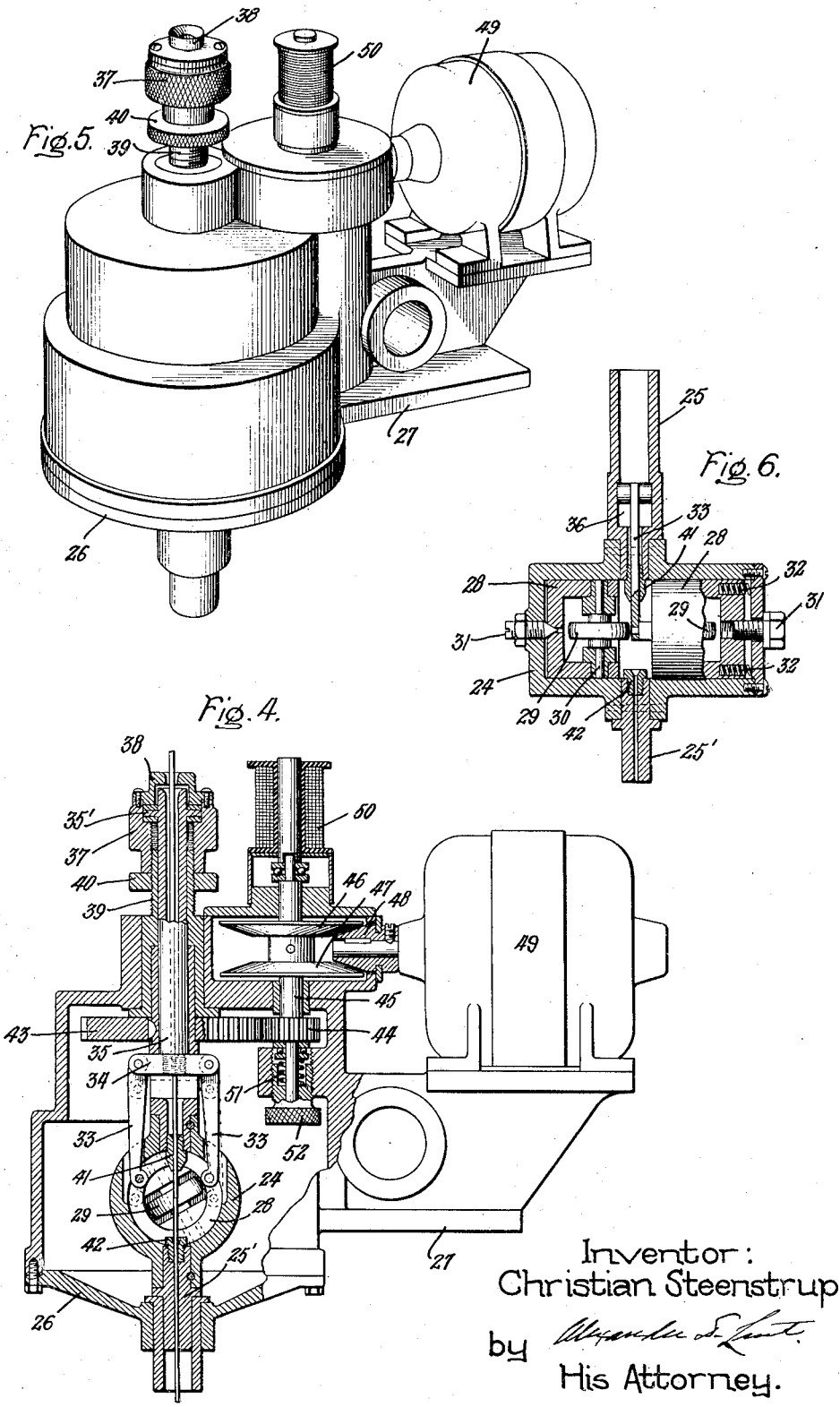

Patented Oct. 29, 1929

1,733,835

UNITED STATES PATENT OFFICE

CHRISTIAN STEENSTRUP, OF SCHENECTADY, NEW YORK, ASSIGNOR TO GENERAL ELECTRIC COMPANY, A CORPORATION OF NEW YORK

WIRE-FEEDING MECHANISM FOR WELDING MACHINES

Application filed November 23, 1927. Serial No. 235,372.

My invention relates to welding and more particularly to improvements in the mechanism of automatic and semi-automatic welding machines used to feed a welding rod or wire towards the work as it is consumed during the welding operation. More particularly my invention relates to an improved mechanism for automatic and semi-automatic arc welding machines.

Hitherto it has been the usual practice in automatic machines for metallic arc welding to feed the electrode in the form of a wire of indefinite length to the work during the welding operation by friction rolls whose axes are at right angles to the electrode and whose surfaces are in frictional engagement with the electrode. In most of these machines of the prior art the feed motor has been connected to the feed rolls through speed reducing gearing since for successful operation it was found that the motor must operate at a comparatively high rate of speed while the feed rolls must turn at a low rate of speed. Change speed gears have likewise been used since the speed at which the electrode is fed must be greater for small electrodes than for larger electrodes and similar changes in speed are necessitated by the use of different current densities and correspondingly different rates of metal deposition.

An object of my invention is to provide an improved feeding device in which the axes of the feed rolls are parallel or nearly parallel to the welding wire and by which the wire is fed toward the work by a screw-like engagement therewith.

A further object of my invention is to provide an improved feeding device which shall be simple and effective and which shall produce a speed reduction inherently.

Further objects of my invention are to provide a wire feeding mechanism which may be built of standard size and form and be readily adjustable to accommodate any desired size of welding wire and adjusted for any desired rate of feed, and which may be used in gas welding machines or arc welding machines adapted to operate on any desired type of welding circuit whether constant voltage, constant current, direct current or alternating current.

My invention will be better understood from the following description taken in connection with the accompanying drawings and its scope will be pointed out in the appended claims.

In the drawings Fig. 1 shows a side view partly in section and Fig. 2 shows an end view of an arc welding head embodying feeding mechanism according to my invention. Fig. 3 shows another arrangement wherein my invention has been applied and Figs. 4 and 5 show a side view partly in section and a perspective view of still another arrangement similar to Figs. 1 and 2 but in which the rate of feed of the electrode may be varied by hand. Fig. 6 shows a detail of the arrangement of Figs. 4 and 5.

In the construction shown in Figs. 1 and 2 the feed rolls 1 are freely mounted on pins 2 in bushings 3 carried by cup shaped members 4. It is of course apparent that instead of feed rolls some other equivalent wire engaging member may be used. These bushings are held against rotation by pins 5 and the bushings and the rolls are adjustable longitudinally by screws 6 for the accommodation of different sizes of electrode wire. The rolls are forced toward each other and against the electrode wire 7 by a rubber washer 8. The cup-shaped members 4 are clamped to a casing 9 by clamping rings 10. This casing is keyed to a hollow shaft 11 rotated by feed motor 12 through bevel gears 13. These gears are enclosed in a casing 14 forming part of a frame 15 upon which the motor 12 is mounted. A collar 16 attached to shaft 11 by a set screw is held between casing 14 and a bracket 17 and serves to hold the shaft 11 in place. The electrode is fed through a guide bushing 18 between the rolls 1 thence through guide bushing 19 into the hollow shaft 11. From the end of this shaft it is fed to a nozzle socket 20 clamped in a bracket 21 forming part of frame 15, and thence through nozzle 22 fastened to socket 20 to the work. The welding current is fed to the socket at the terminal 23, and is conducted to the electrode by nozzle 22 which because of its curved form positively engages the same.

The operation of this embodiment will now be described. If the planes of the rolls 1 were at right angles to the length of the wire it is apparent that the casing 9 and its attached parts which for convenience will be referred to as the flier, if rotated, would have no effect on moving the wire since the rollers would merely roll around the wire. In order to feed the wire longitudinally to maintain the arc, rollers 1 are tilted slightly by loosening rings 10 and moving the cup-shaped members 4 the necessary amount. When tilted in this manner the rolls act as a part of the thread of an inside screw traversing the wire along a spiral path to feed the wire to or from the work in response to the speed and direction of rotation of the feed motor 12 which is so connected with the electrical circuits that after the arc has been struck its speed responds to the rate of electrode consumption in the arc in a manner to maintain the arc length substantially constant.

In a machine constructed according to Figs. 1 and 2 the welding circuit was supplied from a 60 volt constant potential system through series iron wire resistance grids and the welding head was driven by a motor having its armature in shunt to the arc and its field controlled by a vibratory regulator such as shown for example in the application of Paul O. Noble, Serial No. 323,170, filed Sept. 11, 1911, assigned to the same assignee as the present application, or British Patent No. 139,919 to the British Thomson-Houston Company. Ltd. The electrode wire was $\frac{3}{32}''$ in diameter and the feed rolls about 3/8 of an inch wide. The motor ran at about 1000 R. P. M. and the flier at about half this speed. The motor automatically reversed to strike the arc. Only a slight angular adjustment of the rolls was necessary to give the desired rate of feed to the wire which was slightly marked by the rolls. This, however, has no effect on the welding operation. Although there is a slight tendency to twist the wire this is so small that the guide tubes used for the wire prevent any noticeable twisting. The arrangement grips the wire with great certainty, it being practically impossible to pull the wire through the rolls by hand when in adjusted position.

In Figs. 4, 5 and 6 I have shown an embodiment wherein means are provided for adjusting the rolls simultaneously while the machine is in operation and for controlling the rate of electrode feed by regulating the transmitting mechanism between the electrode feed rolls and the feed motor as described in the application of Verni J. Chapman for United States Letters Patent Serial No. 18,562, filed March 26, 1925 and assigned to the same assignee as the present application.

Referring to Figs. 4 and 6, casing 24 corresponds to the flier in Fig. 1 and like it is mounted on a hollow shaft 25, 25' supported at its lower end in a bushing in cover 26 attached to frame 27 and at its upper end in a bushing in the frame which forms an enclosure therefor. Inserted in casing 24 are two radially adjustable bushings 28. Mounted in these bushings are rolls 29 which revolve freely on pins 30. These rolls are adjustable to and from each other by screws 31 and held in engagement with the electrode wire by pressure exerted by springs 32. Connected to the bushings 28 are pivoted links 33 which in turn are pivoted to a crosshead 34 mounted on the lower end of a hollow rod 35. Crosshead 34 slides in a slot 36 in shaft 25. At the other end of rod 35 there is a collar 35' which is fitted into a recess in adjusting nut 37 and held in place by a cap 38. Nut 37 is threaded onto a projecting portion of bushing 39 forming the upper bearing for shaft 25.

By turning this nut the rod 35 may be moved which in turn moves the cross head 34 turning bushings 28 in casing 24 by means of links 33. This varies the angle of the rolls 29 and thus the rate of feed of electrode between them. A lock nut 40 is provided for holding nut 37 in an adjusted position. Inserted in casing 24 are two guide bushings 41 and 42.

Casing 24 is rotated by gear 43 in mesh with gear 44 which is keyed to a shaft 45. This shaft is rotated by friction pullies 46 and 47 in one direction or the other by friction pulley 48 which is driven at a constant speed by the feed motor 49 mounted on frame 27. The direction of rotation of shaft 45 is controlled by solenoid 50 which moves either pulley 46 or 47 into engagement with pulley 48 depending on the extent of its excitation. Solenoid 50 is opposed by a spring 51 whose tension can be adjusted by screw 52. Solenoid 50 may be connected in any appropriate way so as to be responsive to a characteristic of the arc circuit that varies with the arc length, for example, as shown in the above identified application of Verni J. Chapman.

It will thus be seen that in this embodiment the rate of feed of electrode wire may be adjusted by hand while the machine is in operation and further that after once adjusted for any size of wire and current density will be automatically regulated by the arrangement disclosed in the above identified Chapman welding machine. It is obvious that with a constant speed feed motor positively connected to shaft 45, a solenoid might be used to control the angularity of the rolls 29 by its action on the rod 35 to reverse the direction of feed or to control the rate of feed in any one direction with results equivalent to those obtained by the arrangement just described.

In Fig. 3 the electrode is shown as fed through the hollow shaft of the feed motor to the feeding mechanism which corresponds to that shown in Fig. 1. It is believed that the structure is apparent and that it is not necessary to further describe this modification in view of the previous descriptions of the feeding mechanisms shown in Figs. 1 and 4.

It is thus seen that I have provided for automatic arc welding machines an improved electrode feeding mechanism operable by a variable speed motor, the speed of which is automatically varied in accordance with an electrical characteristic of the arc or by a constant speed motor, the speed of the electrode feed being regulated by the transmission mechanism. It will also be apparent that the electrode feeding means is of general utility and may be used to feed the welding rod in automatic gas welding machines or to feed wire in apparatus other than welding machines.

The embodiments of the invention illustrated herein have been selected for the purpose of clearly setting forth the principles involved. It will be apparent, however, that the invention is susceptible of being modified to meet the different conditions encountered in use and I therefore aim to cover by the appended claims all modifications within the true spirit and scope of my invention.

What I claim as new and desire to secure by Letters Patent of the United States, is:—

1. A wire feeding mechanism comprising a member rotatable about the axis of wire feed, means for rotating said member, wire engaging means carried by said member, and means for adjusting said wire engaging means while the parts are in motion for feeding the wire in either direction by said rotatable member.

2. A wire feeding mechanism comprising a member rotatable about the axis of wire feed, means for rotating said member, wire engaging means carried by said member, and means for reversing said wire engaging means while the parts are in motion for feeding the wire in either direction while said member is rotated in the same direction about the wire.

3. A wire feeding mechanism comprising means for engaging the wire when rotated thereabout along a line of travel inclined at an angle to the line of wire feed, means for rotating said wire engaging means about the line of wire feed, and means for adjusting said wire engaging means to change the angularity of said line of travel while the parts are in motion to vary the rate of wire feed.

4. A wire feeding mechanism comprising feed rolls whose axes of rotation are disposed at an angle to one another and to the line of wire feed, a support for said rolls, means for revolving said support about the line of wire feed as an axis and means for adjusting the angularity of the axes of said rolls relative to the line of wire feed while the mechanism is in operation to vary the rate of feed.

5. In an automatic arc welding machine electrode feeding mechanism comprising a plurality of feed rolls whose axes of rotation are disposed at angles to each other and to the longitudinal axis of the electrode to be fed, a support for said rolls, means for adjusting the angularity of the axes of said rolls relative to the longitudinal axis of the electrode and means for revolving the support about the electrode as an axis.

6. A wire feeding mechanism comprising means for engaging the exterior of the wire to be fed, said means traversing a spiral path along the wire, means for rotating said means about the axis of the wire to feed the same, and means for adjusting said first mentioned means while the mechanism is in operation to vary the pitch of the spiral path traveled by said first means.

7. In an automatic arc welding machine, electrode feeding mechanism comprising a plurality of feed rolls whose axes of rotation are disposed at an angle to one another and to the line of electrode feed, a support for said rolls, means for revolving said rolls about the line of electrode feed as an axis, and means for adjusting the angle of said rolls relative to the line of electrode feed while the mechanism is in operation to vary the rate of electrode feed.

8. In an automatic arc welding machine, electrode feeding mechanism comprising means for engaging the exterior of an electrode to be fed, said means traversing a spiral path along the electrode, and means for rotating said means about the axis of the electrode to feed the same relatively thereto.

9. In an automatic arc welding machine, electrode feeding mechanism comprising means for engaging the exterior of an electrode to be fed, said means traversing a spiral path, along the electrode, means for rotating said means about the axis of the electrode to feed the same towards the work, and means for adjusting said first mentioned means while the mechanism is in operation to vary the pitch of the spiral path traveled by said first means.

10. In an automatic arc welding machine, electrode feeding mechanism comprising a casing, a plurality of bushings in said casing, feed rolls rotatable about axes inclined at an angle to one another and to the line of electrode feed carried by said bushings, means acting against said bushings for forcing said rolls into engagement with the electrode to be fed, means for rotating said casing about the line of electrode feed as an axis, and means for adjusting said bushings to change the angle of said rolls relative to the line of electrode feed.

11. In an automatic arc welding machine, electrode feeding mechanism comprising a casing, a plurality of bushings in said casing, feed rolls rotatable about axes inclined at an angle to one another and to the line of electrode feed carried by said bushings, means acting against said bushings for forcing said rolls into engagement with the electrode, means for rotating said casing about the electrode to be fed, and means for adjusting said bushings in said casing to change the angle of said feed rolls relative to the line of electrode feed while the casing is revolving.

12. A wire feeding mechanism comprising a feed roll arranged to rotate on an axis tilted slightly from a parallel relationship with the line of wire feed, means for holding the periphery of said roll in engagement with the surface of the wire to be fed, means for rotating the roll and its holding means bodily about the line of wire feed as an axis, and means for changing the degree of tilt of the axis of the roll relative to the line of wire feed while the roll and its holding means are being rotated.

In witness whereof, I have hereunto set my hand this 22nd day of November, 1927.

CHRISTIAN STEENSTRUP.